US011855255B2

(12) United States Patent
Nishio et al.

(10) Patent No.: US 11,855,255 B2
(45) Date of Patent: Dec. 26, 2023

(54) HALIDE SOLID ELECTROLYTE MATERIAL AND BATTERY INCLUDING THE SAME

(71) Applicant: Panasonic Intellectual Property Management Co., Ltd., Osaka (JP)

(72) Inventors: Yusuke Nishio, Osaka (JP); Akihiro Sakai, Nara (JP); Tetsuya Asano, Nara (JP); Masashi Sakaida, Hyogo (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 564 days.

(21) Appl. No.: 17/120,144

(22) Filed: Dec. 12, 2020

(65) Prior Publication Data

US 2021/0098824 A1    Apr. 1, 2021

Related U.S. Application Data

(63) Continuation of application No. PCT/JP2019/029126, filed on Jul. 25, 2019.

(30) Foreign Application Priority Data

Oct. 1, 2018   (JP) ................................ 2018-186928

(51) Int. Cl.
*H01M 10/0562*   (2010.01)
*H01M 10/0525*   (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS

2012/0301796 A1   11/2012   Ohtomo et al.
2020/0168944 A1    5/2020   Makino

FOREIGN PATENT DOCUMENTS

| JP | 2005-353309 | 12/2005 |
| JP | 2006-244734 | 9/2006 |
| JP | 2011-129312 | 6/2011 |
| WO | 2017/159665 A1 | 9/2017 |

OTHER PUBLICATIONS

The Indian Office Action dated Dec. 6, 2022 for the related Indian Patent Application No. 202147000029.
International Search Report of PCT application No. PCT/JP2019/029126 dated Oct. 21, 2019.

*Primary Examiner* — Nathanael T Zemui
(74) *Attorney, Agent, or Firm* — Rimon P.C.

(57) ABSTRACT

A halide solid electrolyte material according to the present disclosure is represented by the chemical formula $Li_{6-(4+a)b}(Zr_{1-a}M_a)_b X_6$, wherein M denotes at least one element selected from the group consisting of Ta and Nb, X denotes at least one halogen element, and two mathematical formulae 0<a<1 and 0<b<1.5 are satisfied.

8 Claims, 4 Drawing Sheets

HALIDE SOLID ELECTROLYTE MATERIAL AND BATTERY INCLUDING THE SAME

BACKGROUND

1. Technical Field

The present disclosure relates to a halide solid electrolyte material and a battery including the halide solid electrolyte material.

2. Description of the Related Art

Japanese Unexamined Patent Application Publication No. 2011-129312 discloses an all-solid-state battery containing a sulfide solid electrolyte. Japanese Unexamined Patent Application Publication No. 2006-244734 discloses an all-solid-state battery that includes an indium-containing halide as a solid electrolyte.

SUMMARY

One non-limiting and exemplary embodiment provides a lithium-ion-conductive solid electrolyte material and a battery including the solid electrolyte material.

In one general aspect, the techniques disclosed here feature a halide solid electrolyte material represented by the chemical formula (I): $Li_{6-(4+a)b}(Zr_{1-a}M_a)_bX_6$ (I), wherein M denotes at least one element selected from the group consisting of Ta and Nb, X denotes a halogen element, and the following mathematical formulae are satisfied: $0<a<1$ and $0<b<1.5$.

A battery according to the present disclosure includes a positive electrode, a negative electrode, and an electrolyte layer between the positive electrode and the negative electrode, and at least one selected from the group consisting of the positive electrode, the negative electrode, and the electrolyte layer contains the solid electrolyte material.

The present disclosure provides a lithium-ion-conductive solid electrolyte material and a battery including the solid electrolyte material.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described below with reference to the accompanying drawings.

First Embodiment

A halide solid electrolyte material according to a first embodiment is represented by the following chemical formula (I):

$$Li_{6-(4+a)b}(Zr_{1-a}M_a)_bX_6 \qquad (I)$$

wherein

M denotes at least one element selected from the group consisting of Ta and Nb,

X denotes at least one halogen element, and the following mathematical formulae are satisfied:

$$0<a<1, \text{ and}$$

$$0<b<1.5.$$

The halide solid electrolyte material according to the first embodiment has high lithium ion conductivity.

In the chemical formula (I), the mole fraction α of Li is equal to (6−(4+a)b). The mole fraction β of Zr is equal to (1−a)b. The mole fraction γ of M is equal to ab. In the actual analysis of the solid electrolyte material, α, β, and γ may have an error of approximately 5% or less (desirably approximately 3% or less). The chemical formula (I) is satisfied with such an error.

In other words, the following three mathematical formulae may be satisfied:

$$0.95 \le A/\alpha \le 1.05,$$

$$0.95 \le B/\beta \le 1.05, \text{ and}$$

$$0.95 \le C/\gamma \le 1.05,$$

wherein

A, B, and C denote the mole fractions of Li, Zr, and M, respectively, determined by actually analyzing the halide solid electrolyte material by an analysis method, such as atomic absorption spectrometry or inductively coupled plasma emission spectrometry (hereinafter referred to as an "ICP-AES method").

It is desirable that the following three mathematical formulae be satisfied:

$$0.97 \le A/\alpha \le 1.03,$$

$$0.97 \le B/\beta \le 1.03, \text{ and}$$

$$0.97 \le C/\gamma \le 1.03.$$

In other words, the halide solid electrolyte material according to the first embodiment is a halogenated metal composite compound represented by $Li_2ZrX_6$, wherein Li or Zr is partially substituted with M.

To increase the lithium ion conductivity of the halide solid electrolyte material, the mathematical formula $0.01 \le a \le 0.7$ may be satisfied. It is desirable that the mathematical formula $0.01 \le a \le 0.4$ be satisfied.

To further increase the lithium ion conductivity of the halide solid electrolyte material, the mathematical formula $0.5 \le b \le 1.3$ may be satisfied. It is desirable that the mathematical formula $0.8 \le b \le 1.1$ be satisfied.

M may denote Ta. M may denote Nb. M may denote a combination of Ta and Nb.

For example, the halide solid electrolyte material according to the first embodiment is represented by the chemical formula (II): $Li_{6-(4+a)b}(Zr_{1-a}M_a)_bCl_{6-x-y}Br_xI_y$ (wherein $0 \le x \le 6$, $0 \le y \le 6$, and $(x+y) \le 6$). Such a halide solid electrolyte material has high lithium ion conductivity.

To further increase the lithium ion conductivity of the halide solid electrolyte material, the mathematical formula (x+y)<6 may be satisfied.

To further increase the lithium ion conductivity of the halide solid electrolyte material, the mathematical formula (x+y)≤1.2 may be satisfied. In other words, in the chemical formula (I), 80 atomic percent or more of X may be occupied by Cl. To further increase the lithium ion conductivity of the halide solid electrolyte material, the mathematical formula x=y=0 may be satisfied. In other words, all X in the chemical formula (I) may be Cl.

The halide solid electrolyte material according to the first embodiment can be used to produce an all-solid-state battery with good charge-discharge characteristics. The all-solid-state battery may be a primary battery or a secondary battery. The halide solid electrolyte material according to the first embodiment can be used to produce a sulfur-free all-solid-state battery. Even when the halide solid electrolyte material according to the first embodiment is exposed to the atmosphere, no hydrogen sulfide is generated. Thus, an all-solid-state battery including the halide solid electrolyte material according to the first embodiment is fairly safe. It should be noted that hydrogen sulfide may be generated when a sulfide solid electrolyte disclosed in Japanese Unexamined Patent Application Publication No. 2011-129312 is exposed to the atmosphere.

The halide solid electrolyte material according to the first embodiment may be crystalline or amorphous.

The halide solid electrolyte material according to the first embodiment is not limited to any particular shape. The shape may be acicular, spherical, or ellipsoidal. The halide solid electrolyte material according to the first embodiment may be particles. The halide solid electrolyte material according to the first embodiment may be formed in a pellet or sheet shape.

For example, when the halide solid electrolyte material according to the first embodiment is particulate (for example, spherical), the halide solid electrolyte material according to the first embodiment may have a median size of 0.1 micrometers or more and 100 micrometers or less. The median size means the particle size when the cumulative volume in the volumetric particle size distribution is equal to 50%. The volumetric particle size distribution can be measured with a laser diffraction measuring apparatus or an image analyzer.

To further increase the lithium ion conductivity of the halide solid electrolyte material according to the first embodiment and to uniformly disperse the halide solid electrolyte material according to the first embodiment and an active material described later, the median size may be 0.5 micrometers or more and 10 micrometers or less.

To further uniformly disperse the halide solid electrolyte material according to the first embodiment and the active material, the halide solid electrolyte material according to the first embodiment may have a smaller median size than the active material.

<Method for Producing Halide Solid Electrolyte Material>

The halide solid electrolyte material according to the first embodiment can be produced by the following method.

First, two or more halide raw powders are mixed so as to have a desired composition. A mixture is thus prepared.

For example, when the desired composition is $Li_{1.9}Zr_{0.9}Ta_{0.1}Cl_6$, a LiCl raw powder, a $ZrCl_4$ raw powder, and an $TaCl_5$ raw powder are mixed at a $LiCl:ZrCl_4:TaCl_5$ mole ratio of approximately 1.9:0.9:0.1.

The raw powders may be mixed at a preadjusted mole ratio to offset a possible compositional change in the synthesis process described in the next paragraph.

The raw powders in the mixture are mechanically reacted with each other in a mixing apparatus, such as a planetary ball mill, (that is, by a mechanochemical milling method) to obtain a reaction product. The reaction product may be baked in a vacuum or in an inert atmosphere. Alternatively, the mixture may be baked in a vacuum or in an inert atmosphere to obtain a reaction product.

The baking may be performed at a temperature in the range of 100° C. to 400° C. for 1 hour or more. To prevent the composition change caused by baking, the reaction product or mixture may be put in an airtight container, such as a quartz tube, before baking. A desired halide solid electrolyte material is thus prepared.

Second Embodiment

A second embodiment is described below. The items described in the first embodiment may be omitted.

An electrochemical device including the halide solid electrolyte material according to the first embodiment is described in the second embodiment.

A battery is described below as an example of the electrochemical device according to the second embodiment. The battery according to the second embodiment includes a positive electrode, a negative electrode, and an electrolyte layer. The electrolyte layer is located between the positive electrode and the negative electrode. At least one selected from the group consisting of the positive electrode, the electrolyte layer, and the negative electrode contains the halide solid electrolyte material according to the first embodiment. The battery according to the second embodiment has good charge-discharge characteristics. The battery may be an all-solid-state battery.

Figure 1:
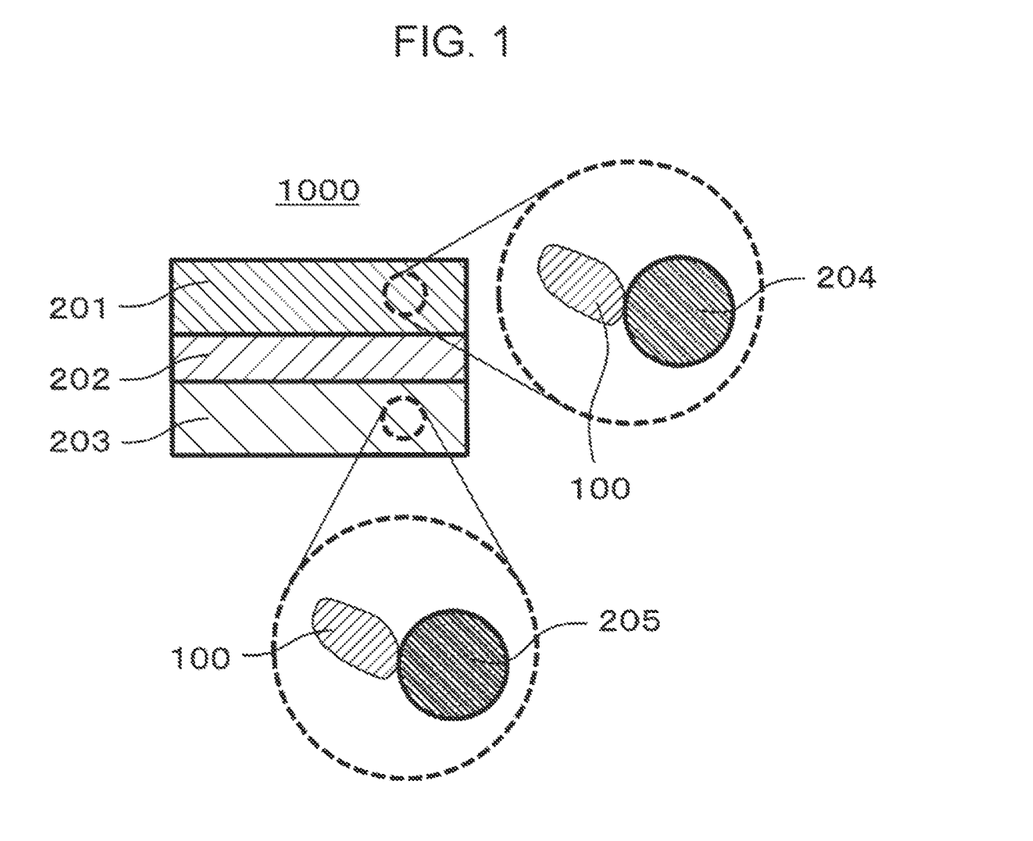
FIG. 1 is a cross-sectional view of a battery according to a second embodiment.

FIG. 1 is a cross-sectional view of a battery 1000 according to the second embodiment. The battery 1000 includes a positive electrode 201, an electrolyte layer 202, and a negative electrode 203. The positive electrode 201 contains positive-electrode active material particles 204 and solid electrolyte particles 100. The electrolyte layer 202 is located between the positive electrode 201 and the negative electrode 203. The electrolyte layer 202 contains an electrolyte material (for example, a halide solid electrolyte material). The negative electrode 203 contains negative-electrode active material particles 205 and the solid electrolyte particles 100.

The solid electrolyte particles 100 are composed of a halide solid electrolyte material or composed mainly of a halide solid electrolyte material.

The positive electrode 201 contains the positive-electrode active material particles 204, which can adsorb and desorb metal ions (for example, lithium ions).

Examples of the positive-electrode active material include lithium-containing transition metal oxides (for example, $LiNi_{1-d-f}Co_dAl_fO_2$ (wherein 0<d, 0<f, and 0<(d+f)<1) and $LiCoO_2$), transition metal fluorides, polyanion materials, fluorinated polyanion materials, transition metal sulfides, transition metal oxyfluorides, transition metal oxysulfides, and transition metal oxynitrides.

To achieve a good dispersion state of the positive-electrode active material particles 204 and the solid electrolyte particles 100 in the positive electrode 201, it is desirable that the positive-electrode active material particles 204 have a median size of 0.1 micrometers or more. The good dispersion state improves the charge-discharge characteristics of the battery 1000. To rapidly diffuse lithium in the positive-electrode active material particles 204, it is desirable that the positive-electrode active material particles 204 have a median size of 100 micrometers or less. Rapid diffusion of lithium enables the battery 1000 to operate at high output. As described above, the positive-electrode active material particles 204 may have a median size of 0.1 micrometers or more and 100 micrometers or less.

To easily achieve the good dispersion state of the positive-electrode active material particles 204 and the solid electrolyte particles 100, the positive-electrode active material particles 204 may have a larger median size than the solid electrolyte particles 100.

From the perspective of the energy density and output of the battery, the ratio of the volume Vca1 of the positive-electrode active material particles 204 to the total of the volume Vca1 of the positive-electrode active material particles 204 and the volume Vce1 of the solid electrolyte particles 100 in the positive electrode 201 may be 0.3 or more and 0.95 or less. Briefly, the (Vca1)/(Vca1+Vce1) ratio may be 0.3 or more and 0.95 or less.

From the perspective of the energy density and output of the battery, the positive electrode 201 may have a thickness of 10 micrometers or more and 500 micrometers or less.

The electrolyte layer 202 contains an electrolyte material. The electrolyte material may be the halide solid electrolyte material according to the first embodiment. The electrolyte layer 202 may be a solid electrolyte layer. The electrolyte layer 202 typically has lithium ion conductivity but does not have electronic conductivity.

The electrolyte layer 202 may be composed only of the halide solid electrolyte material according to the first embodiment. Alternatively, the electrolyte layer 202 may be composed only of a solid electrolyte material different from the halide solid electrolyte material according to the first embodiment.

Examples of the solid electrolyte material different from the halide solid electrolyte material according to the first embodiment include $Li_2MgX_4$, $Li_2FeX_4$, $Li(Al, Ga, In)X_4$, $Li_3(Al, Ga, In)X_6$, and LiX. X denotes a halogen element (that is, at least one element selected from the group consisting of F, Cl, Br, and I).

The halide solid electrolyte material according to the first embodiment is hereinafter referred to as a first solid electrolyte material. The solid electrolyte material different from the halide solid electrolyte material according to the first embodiment is referred to as a second solid electrolyte material.

The electrolyte layer 202 may contain not only the first solid electrolyte material but also the second solid electrolyte material. The first solid electrolyte material and the second solid electrolyte material in the electrolyte layer 202 may be uniformly dispersed. A layer formed of the first solid electrolyte material and a layer formed of the second solid electrolyte material may be stacked in the stacking direction of the battery 1000.

From the perspective of the prevention of a short circuit between the positive electrode 201 and the negative electrode 203 and the high output of the battery, the solid electrolyte layer may have a thickness of 1 micrometer or more and 100 micrometers or less.

The negative electrode 203 contains the negative-electrode active material particles 205, which can adsorb and desorb metal ions (for example, lithium ions).

Examples of the negative-electrode active material include metallic materials, carbon materials, oxides, nitrides, tin compounds, and silicon compounds. The metallic materials may be single metals or alloys. Examples of the metallic materials include lithium metal and lithium alloys. Examples of the carbon materials include natural graphite, coke, carbon during graphitization, carbon fiber, spherical carbon, artificial graphite, and amorphous carbon. From the perspective of capacity density, appropriate examples of the negative-electrode active material include silicon (that is, Si), tin (that is, Sn), silicon compounds, and tin compounds.

To achieve a good dispersion state of the negative-electrode active material particles 205 and the solid electrolyte particles 100 in the negative electrode 203, the negative-electrode active material particles 205 may have a median size of 0.1 micrometers or more. The good dispersion state improves the charge-discharge characteristics of the battery. To rapidly diffuse lithium in the negative-electrode active material particles 205, the negative-electrode active material particles 205 may have a median size of 100 micrometers or less. Rapid diffusion of lithium enables the battery to operate at high output. As described above, the negative-electrode active material particles 205 may have a median size of 0.1 micrometers or more and 100 micrometers or less.

To easily achieve the good dispersion state of the negative-electrode active material particles 205 and the solid electrolyte particles 100, the negative-electrode active material particles 205 may have a larger median size than the solid electrolyte particles 100.

From the perspective of the energy density and output of the battery, the ratio of the volume vaa1 of the negative-electrode active material particles 205 to the total of the volume vaa1 of the negative-electrode active material particles 205 and the volume vae1 of the solid electrolyte particles 100 in the negative electrode 203 may be 0.3 or more and 0.95 or less. Briefly, the (vaa1)/(vaa1+vae1) ratio may be 0.3 or more and 0.95 or less.

From the perspective of the energy density and output of the battery, the negative electrode 203 may have a thickness of 10 micrometers or more and 500 micrometers or less.

To increase ionic conductivity, chemical stability, and electrochemical stability, at least one selected from the group consisting of the positive electrode 201, the electrolyte layer 202, and the negative electrode 203 may contain the second solid electrolyte material.

As described above, the second solid electrolyte material may be a halide solid electrolyte. Examples of the halide solid electrolyte include $Li_2MgX_4$, $Li_2FeX_4$, $Li(Al, Ga, In)X_4$, $Li_3(Al, Ga, In)X_6$, and LiX. X denotes a halogen element (that is, at least one element selected from the group consisting of F, Cl, Br, and I).

The second solid electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte include
(i) NASICON solid electrolytes, such as $LiTi_2(PO_4)_3$ and element-substituted products thereof,
(ii) $(LaLi)TiO_3$-based perovskite solid electrolytes,
(iii) LISICON solid electrolytes, such as $Li_{14}ZnGe_4O_{16}$, $Li_4SiO_4$, $LiGeO_4$, and element-substituted products thereof,
(iv) garnet solid electrolytes, such as $Li_7La_3Zr_2O_{12}$ and element-substituted products thereof, and
(v) $Li_3PO_4$ and N-substitution products thereof.

The second solid electrolyte material may be an organic polymer solid electrolyte.

Examples of the organic polymer solid electrolytes include compounds of a polymer and a lithium salt. The polymer may have an ethylene oxide structure. A polymer with an ethylene oxide structure can contain a large amount of lithium salt and can have further increased ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate lithium ion transfer and improve the output characteristics of the battery 1000, at least one selected from the group consisting of the positive electrode 201, the negative electrode 203, and the electrolyte layer 202 may contain a non-aqueous electrolyte solution, gel electrolyte, or ionic liquid.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvents include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

One non-aqueous solvent selected from these may be used alone, or a mixture of two or more non-aqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$.

One lithium salt selected from these may be used alone, or a mixture of two or more lithium salts selected from these may be used.

The concentration of the lithium salt is 0.5 mol/l or more and 2 mol/l or less, for example.

The gel electrolyte may be a polymer material impregnated with a non-aqueous electrolyte solution. Examples of the polymer material include poly(ethylene oxide), polyacrylonitrile, poly(vinylidene difluoride), poly(methyl methacrylate), and polymers with an ethylene oxide bond.

Examples of Cations in the Ionic Liquid Include
  (i) aliphatic chain quaternary salts, such as tetraalkylammonium and tetraalkylphosphonium,
  (ii) alicyclic ammoniums, such as pyrrolidinium, morpholinium, imidazolinium, tetrahydropyrimidinium, piperazinium, and piperidinium, and
  (iii) nitrogen-containing heteroaromatic cations, such as pyridinium and imidazolium.

An anion in the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

To improve the adhesion between particles, at least one selected from the group consisting of the positive electrode 201, the negative electrode 203, and the electrolyte layer 202 may contain a binder.

Examples of the binder include poly(vinylidene difluoride), polytetrafluoroethylene, polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose.

A copolymer may also be used as a binder. Examples of such a binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

A mixture of two or more selected from these materials may be used as a binder.

To increase electronic conductivity, at least one selected from the positive electrode 201 and the negative electrode 203 may contain a conductive aid.

Examples of the Conductive Aid Include
  (i) graphites, such as natural graphite and artificial graphite,
  (ii) carbon blacks, such as acetylene black and Ketjen black,
  (iii) electrically conductive fibers, such as carbon fiber and metal fiber,
  (iv) fluorocarbons,
  (v) metal powders, such as an aluminum powder,
  (vi) electrically conductive whiskers, such as zinc oxide whiskers and potassium titanate whiskers,
  (vii) electrically conductive metal oxides, such as titanium oxide, and
  (viii) electrically conductive polymers, such as polyaniline, polypyrrole, and polythiophene.

With respect to the shape of the battery according to the second embodiment, the battery is a coin battery, a cylindrical battery, a rectangular battery, a sheet battery, a button battery (that is, a button cell), a flat battery, or a laminated battery.

EXAMPLES

The present disclosure is described in detail in the following examples.

Example 1

Preparation of Halide Solid Electrolyte Material

A LiCl powder, a $ZrCl_4$ powder, and an $TaCl_5$ powder were prepared in an argon atmosphere with a dew point of −90° C. or less (hereinafter referred to as a dry argon atmosphere) such that the $LiCl:ZrCl_4:TaCl_5$ mole ratio was 1.9:0.9:0.1. These powders were ground and mixed in a mortar. A mixture was thus prepared. The mixture was then milled in a planetary ball mill at 600 rpm for 25 hours for a mechanochemical reaction. A powder of the halide solid electrolyte material according to Example 1 was thus prepared. The halide solid electrolyte material according to Example 1 had a composition represented by the composition formula $Li_{1.9}Zr_{0.9}Ta_{0.1}Cl_6$. Thus, the a and b values in Example 1 were 0.10 and 1, respectively.

The Li content per unit mass of the halide solid electrolyte material according to Example 1 was measured by atomic absorption spectrometry. The Zr content and Ta content of the halide solid electrolyte material according to Example 1 were measured by high-frequency inductively coupled plasma spectroscopy. The Li:Zr:Ta mole ratio was calculated from the Li, Zr, and Ta contents determined by these measurements. The halide solid electrolyte material according to Example 1 had a Li:Zr:Ta atomic ratio (that is a Li:Zr:Ta mole ratio) of 1.9:0.9:1.0. Thus, in Example 1, the Li:Zr:Ta mole ratio of the halide solid electrolyte material according to Example 1 was the same as the Li:Zr:Ta mole ratio of the LiCl powder, the $ZrCl_4$ powder, and the $TaCl_5$ powder in the mixture.

Evaluation of Ion Conductivity

Figure 2:
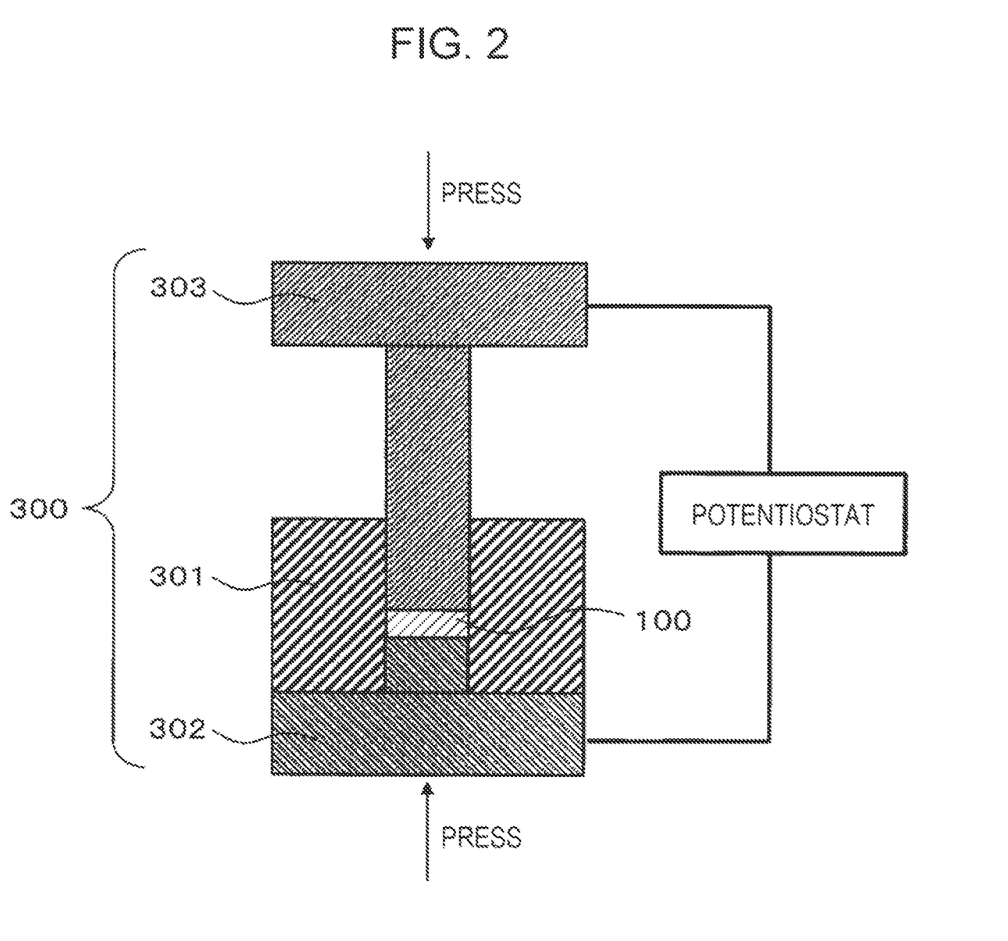
FIG. 2 is a schematic view of a press forming die used to measure the ionic conductivity of a halide solid electrolyte material.

FIG. 2 is a schematic view of a press forming die 300 used to measure the ionic conductivity of a halide solid electrolyte material. The press forming die 300 included a mold 301, a punch lower portion 302, and a punch upper portion 303. The mold 301 was formed of an insulating polycarbonate. The punch upper portion 303 and the punch lower portion 302 were formed of an electrically conductive stainless steel.

The press forming die 300 illustrated in FIG. 2 was used to measure the ionic conductivity of the halide solid electrolyte material according to Example 1 by the following method.

The press forming die 300 was filled with the powder of the halide solid electrolyte material according to Example 1 in a dry argon atmosphere.

A pressure of 400 MPa was applied to the halide solid electrolyte material according to Example 1 in the press forming die 300 via the punch upper portion 303.

Under the pressure, the impedance of the halide solid electrolyte material according to Example 1 was measured at room temperature by an electrochemical impedance measurement method with a potentiostat (manufactured by Princeton Applied Research, trade name "VersaSTAT4") via the punch lower portion 302 and the punch upper portion 303.

Figure 3:
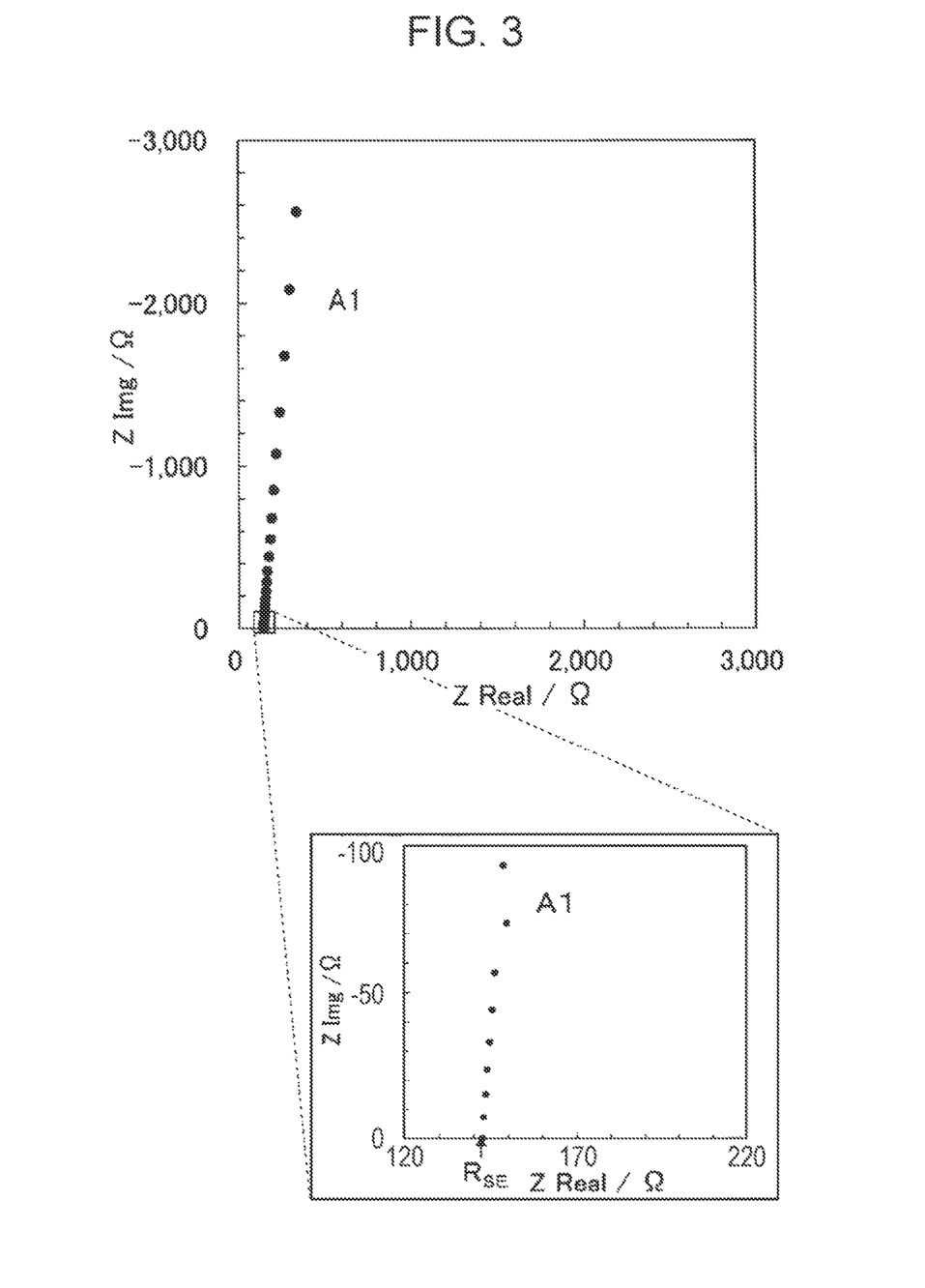
FIG. 3 is a graph of a Cole-Cole plot of the impedance measurement of a halide solid electrolyte material according to Example 1.

FIG. 3 is a graph of a Cole-Cole plot of the impedance measurement.

In FIG. 3, the real number of the complex impedance at a point of measurement at which the absolute value of the phase of the complex impedance was smallest was considered to be the resistance to the ionic conduction of the halide solid electrolyte material. For the real number, see the arrow $R_{SE}$ in FIG. 3. The ionic conductivity was calculated from the resistance using the following mathematical formula (III):

$$\sigma = (R_{SE} \times S/t)^{-1} \quad \text{(III)}$$

wherein

σ denotes the ionic conductivity,

S denotes the contact area between the solid electrolyte material and the punch upper portion 303 (which is equal to the cross-sectional area of the hollow portion in the mold 301 in FIG. 2), $R_{SE}$ denotes the resistance of the solid electrolyte material in the impedance measurement, and t denotes the thickness of the solid electrolyte material under the pressure (which is equal to the thickness of a layer formed of the solid electrolyte particles 100 in FIG. 2).

The ionic conductivity of the halide solid electrolyte material according to Example 1 measured at 22° C. was $51 \times 10^{-5}$ S/cm.

Production of Secondary Battery

The powder of the halide solid electrolyte material according to Example 1 and $LiCoO_2$ were prepared at a volume ratio of 30:70 in a dry argon atmosphere. These materials were mixed in an agate mortar to prepare a mixture. The $LiCoO_2$ functioned as an active material.

The halide solid electrolyte material according to Example 1 (100 mg), the mixture (9.9 mg), and an aluminum metal powder (14.7 mg) were successively layered in an insulating case with an inner diameter of 9.5 millimeters to prepare a layered body. A pressure of 300 MPa was applied to the layered body to form a first electrode and a solid electrolyte layer. The first electrode was formed of aluminum. The solid electrolyte layer was formed of the powder of the halide solid electrolyte material according to Example 1 and the $LiCoO_2$.

The solid electrolyte layer was brought into contact with a metal indium foil. The solid electrolyte layer was located between the metal indium foil and the first electrode. The metal indium foil had a thickness of 200 micrometers. A pressure of 80 MPa was then applied to the metal indium foil. A second electrode formed of the metal indium foil was thus formed.

A stainless steel current collector was attached to the first electrode and the second electrode, and a current collector lead was then attached to the current collector. Finally, an insulating ferrule was used to isolate the inside of the insulating case from the outside air atmosphere and seal the insulating case. A secondary battery according to Example 1 was thus produced. [Charge-Discharge Test]

The secondary battery was placed in a thermostat maintained at 25° C.

The battery according to Example 1 was charged at a current density of 0.068 mA/cm² to a voltage of 3.6 volts. This current density corresponds to a rate of 0.05 C.

The battery according to Example 1 was then discharged at a current density of 0.068 mA/cm² to a voltage of 1.9 volts.

The charge-discharge test showed that the secondary battery according to Example 1 had an initial discharge capacity of 274 μAh.

Figure 4:
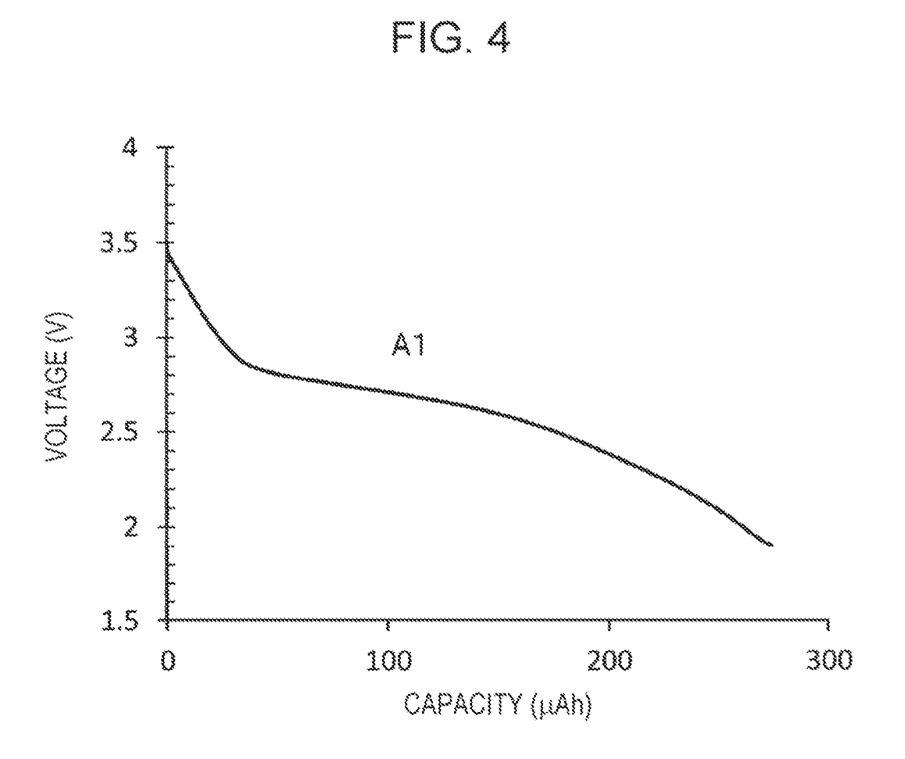
FIG. 4 is a graph of the initial discharging characteristics of a battery according to Example 1.

FIG. 4 is a graph of the initial discharging characteristics of the secondary battery according to Example 1.

Examples 2 to 24

An experiment in Examples 2 to 24 was performed in the same manner as in Example 1 except that the LiCl powder, the $ZrCl_4$ powder, and an $MCl_5$ powder were prepared such that the $LiCl:ZrCl_4:MCl_5$ mole ratio was (6−(4+a)b):(1−a)b:ab. The element M is listed in Table 1. Table 1 also lists the a and b values.

Example 25

An experiment in Example 15 was performed in the same manner as in Example 1 except that the LiBr powder, the $ZrBr_4$ powder, and a $TaBr_5$ powder were prepared such that the $LiBr:ZrBr_4:TaBr_5$ mole ratio was 2.265:0.765:0.135.

Example 26

An experiment in Example 26 was performed in the same manner as in Example 1 except that the LiBr powder, the ZrCl$_4$ powder, a ZrBr$_4$ powder, and a TaCl$_5$ powder were prepared such that the LiBr:ZrCl$_4$:ZrBr$_4$:TaCl$_5$ mole ratio was 2.265:0.581:0.184:0.135.

Example 27

An experiment in Example 27 was performed in the same manner as in Example 1 except that the LiBr powder, the ZrCl$_4$ powder, the ZrBr$_4$ powder, and a NbCl$_5$ powder were prepared such that the LiBr:ZrCl$_4$:ZrBr$_4$:NbCl$_5$ mole ratio was 2.22:0.525:0.195:0.18.

Example 28

An experiment in Example 28 was performed in the same manner as in Example 1 except that a LiI powder, the LiBr powder, the ZrCl$_4$ powder, the ZrBr$_4$ powder, and the TaCl$_5$ powder were prepared such that the LiI:LiBr:ZrCl$_4$:ZrBr$_4$:TaCl$_5$ mole ratio was 2:0.265:0.331:0.434:0.135.

Example 29

An experiment in Example 29 was performed in the same manner as in Example 1 except that a LiI powder, the LiBr powder, the ZrCl$_4$ powder, the ZrBr$_4$ powder, and the NbCl$_5$ powder were prepared such that the LiI:LiBr:ZrCl$_4$:ZrBr$_4$:NbCl$_5$ mole ratio was 2:0.22:0.275:0.445:0.18.

The ionic conductivity of each halide solid electrolyte in Examples 2 to 29 was measured in the same manner as in Example 1. Table 1 shows the results.

Each halide solid electrolyte in Examples 2 to 29 was used to produce a secondary battery in the same manner as in Example 1. Like the battery according to Example 1, the batteries according to Examples 2 to 29 had good charge-discharge characteristics.

Comparative Example 1

In Comparative Example 1, a LiBr powder and an InBr$_3$ powder were prepared such that the LiBr:InBr$_3$ mole ratio was 3:1. The powders were ground in a mortar to prepare a mixture. A pressure was applied to the mixture to form a pellet. The pellet was put into a glass tube under vacuum and was then baked at 200° C. for 1 week. A solid electrolyte material according to Comparative Example 1 was thus prepared. The solid electrolyte material according to Comparative Example 1 had a composition represented by Li$_3$InBr$_6$. The ionic conductivity of the solid electrolyte material according to Comparative Example 1 was measured in the same manner as in Example 1. The ionic conductivity measured at 22° C. was less than 1×10$^{-7}$ S/cm.

Comparative Example 2

In Comparative Example 2, a LiCl powder and an FeCl$_2$ powder were prepared such that the LiCl:FeCl$_2$ mole ratio was 2:1. The powders were mechanochemically mixed in the same manner as in Example 1. A solid electrolyte material according to Comparative Example 2 was thus prepared. The solid electrolyte material according to Comparative Example 2 had a composition represented by Li$_2$FeCl$_4$. The ionic conductivity of the solid electrolyte material according to Comparative Example 2 was measured in the same manner as in Example 1. The ionic conductivity measured at 22° C. was 9×10$^{-6}$ S/cm.

The solid electrolyte material according to Comparative Example 2 was used to produce a secondary battery in the same manner as in Example 1. The secondary battery according to Comparative Example 2 was subjected to a charge-discharge test. The secondary battery according to Comparative Example 2 had an initial discharge capacity of 1 µAh or less. Thus, the secondary battery according to Comparative Example 2 could not be charged or discharged. In other words, the secondary battery according to Comparative Example 2 did not function as a battery.

Table 1 lists the ionic conductivities measured in Examples 1 to 29. Table 2 lists the ionic conductivities measured in Comparative Examples 1 and 2.

TABLE 1

| | Composition | a | b | M | X | Ionic conductivity (×10$^{-5}$ S/cm) |
|---|---|---|---|---|---|---|
| 1 | Li$_{1.9}$Zr$_{0.9}$Ta$_{0.1}$Cl$_6$ | 0.1 | 1 | Ta | Cl | 51 |
| 2 | Li$_{1.85}$Zr$_{0.85}$Ta$_{0.15}$Cl$_6$ | 0.15 | 1 | Ta | Cl | 54 |
| 3 | Li$_{1.8}$Zr$_{0.8}$Ta$_{0.2}$Cl$_6$ | 0.2 | 1 | Ta | Cl | 52 |
| 4 | Li$_{1.75}$Zr$_{0.75}$Ta$_{0.25}$Cl$_6$ | 0.25 | 1 | Ta | Cl | 46 |
| 5 | Li$_{1.7}$Zr$_{0.7}$Ta$_{0.3}$Cl$_6$ | 0.3 | 1 | Ta | Cl | 38 |
| 6 | Li$_{1.6}$Zr$_{0.6}$Ta$_{0.4}$Cl$_6$ | 0.4 | 1 | Ta | Cl | 35 |
| 7 | Li$_{1.3}$Zr$_{0.3}$Ta$_{0.7}$Cl$_6$ | 0.7 | 1 | Ta | Cl | 1.7 |
| 8 | Li$_{3.925}$(Zr$_{0.85}$Ta$_{0.15}$)$_{0.5}$Cl$_6$ | 0.15 | 0.5 | Ta | Cl | 17 |
| 9 | Li$_{2.68}$(Zr$_{0.85}$Ta$_{0.15}$)$_{0.8}$Cl$_6$ | 0.15 | 0.8 | Ta | Cl | 38 |
| 10 | Li$_{2.265}$(Zr$_{0.85}$Ta$_{0.15}$)$_{0.9}$Cl$_6$ | 0.15 | 0.9 | Ta | Cl | 62 |
| 11 | Li$_{1.435}$(Zr$_{0.85}$Ta$_{0.15}$)$_{1.1}$Cl$_6$ | 0.15 | 1.1 | Ta | Cl | 19 |
| 12 | Li$_{0.605}$(Zr$_{0.85}$Ta$_{0.15}$)$_{1.3}$Cl$_6$ | 0.15 | 1.3 | Ta | Cl | 2.3 |
| 13 | Li$_{1.95}$Zr$_{0.95}$Nb$_{0.05}$Cl$_6$ | 0.05 | 1 | Nb | Cl | 40 |
| 14 | Li$_{1.9}$Zr$_{0.9}$Nb$_{0.1}$Cl$_6$ | 0.1 | 1 | Nb | Cl | 48 |
| 15 | Li$_{1.85}$Zr$_{0.85}$Nb$_{0.15}$Cl$_6$ | 0.15 | 1 | Nb | Cl | 51 |
| 16 | Li$_{1.8}$Zr$_{0.8}$Nb$_{0.2}$Cl$_6$ | 0.2 | 1 | Nb | Cl | 53 |
| 17 | Li$_{1.75}$Zr$_{0.75}$Nb$_{0.25}$Cl$_6$ | 0.25 | 1 | Nb | Cl | 48 |
| 18 | Li$_{1.7}$Zr$_{0.7}$Nb$_{0.3}$Cl$_6$ | 0.3 | 1 | Nb | Cl | 42 |
| 19 | Li$_{1.3}$Zr$_{0.3}$Nb$_{0.7}$Cl$_6$ | 0.7 | 1 | Nb | Cl | 4.0 |
| 20 | Li$_{3.9}$(Zr$_{0.8}$Nb$_{0.2}$)$_{0.5}$Cl$_6$ | 0.2 | 0.5 | Nb | Cl | 12 |
| 21 | Li$_{2.64}$(Zr$_{0.8}$Nb$_{0.2}$)$_{0.8}$Cl$_6$ | 0.2 | 0.8 | Nb | Cl | 27 |
| 22 | Li$_{2.22}$(Zr$_{0.8}$Nb$_{0.2}$)$_{0.9}$Cl$_6$ | 0.2 | 0.9 | Nb | Cl | 53 |
| 23 | Li$_{1.38}$(Zr$_{0.8}$Nb$_{0.2}$)$_{1.1}$Cl$_6$ | 0.2 | 1.1 | Nb | Cl | 14 |
| 24 | Li$_{0.54}$(Zr$_{0.8}$Nb$_{0.2}$)$_{1.3}$Cl$_6$ | 0.2 | 1.3 | Nb | Cl | 1.1 |
| 25 | Li$_{2.265}$(Zr$_{0.85}$Ta$_{0.15}$)$_{0.9}$Br$_6$ | 0.15 | 0.9 | Ta | Br | 5.1 |
| 26 | Li$_{2.265}$(Zr$_{0.85}$Ta$_{0.15}$)$_{0.9}$Br$_3$Cl$_3$ | 0.15 | 0.9 | Ta | Br, Cl | 21 |
| 27 | Li$_{2.22}$(Zr$_{0.8}$Nb$_{0.2}$)$_{0.9}$Br$_3$Cl$_3$ | 0.2 | 0.9 | Nb | Br, Cl | 12 |
| 28 | Li$_{2.265}$(Zr$_{0.85}$Ta$_{0.15}$)$_{0.9}$Br$_2$Cl$_2$I$_2$ | 0.15 | 0.9 | Ta | Br, Cl, I | 42 |
| 29 | Li$_{2.22}$(Zr$_{0.8}$Ta$_{0.2}$)$_{0.9}$Br$_2$Cl$_2$I$_2$ | 0.2 | 0.9 | Nb | Br, Cl, I | 11 |

TABLE 2

| Comparative example | Composition | M | X | Ionic conductivity (S/cm) |
|---|---|---|---|---|
| 1 | Li$_3$InBr$_6$ | In | Br | less than 1 × 10$^{-7}$ |
| 2 | Li$_2$FeCl$_4$ | Fe | Cl | 9 × 10$^{-6}$ |

As is clear from Tables 1 and 2, the halide solid electrolytes in Examples 1 to 29 have a high ionic conductivity of 1×10$^{-5}$ S/cm or more at room temperature. By contrast, the halide solid electrolytes in Comparative Examples 1 and 2 have a low ionic conductivity of less than 1×10$^{-7}$ S/cm and 9×10$^{-6}$ S/cm or less, respectively.

Satisfying the mathematical formula $0.01 \leq a \leq 0.7$ further improves the ionic conductivity.

A comparison between the halide solid electrolytes according to Examples 1 to 7 shows that satisfying the mathematical formula $0.01 \leq a \leq 0.4$ (desirably $0.05 \leq a \leq 0.4$) results in further increased ionic conductivity.

The b value refers to the Li deficiency relative to the stoichiometric ratio (that is, a difference from the stoichiometric ratio of Li). A b value of 0.5 or more and 1.3 or less results in high ionic conductivity.

A comparison between the halide solid electrolytes according to Examples 9 to 11 and the halide solid electrolytes according to Examples 8 and 12 shows that a b value of 0.8 or more and 1.1 or less results in further increased ionic conductivity. This is also supported by a comparison between the halide solid electrolytes according to Examples 21 to 23 and the halide solid electrolytes according to Examples 20 and 24.

The batteries in Examples 1 to 29 could be charged and discharged at room temperature. By contrast, the battery in Comparative Example 2 could not be charged or discharged.

The halide solid electrolytes in Examples 1 to 29 contain no sulfur and do not generate hydrogen sulfide.

Thus, a halide solid electrolyte material according to the present disclosure does not generate hydrogen sulfide, has high lithium ion conductivity, and is suitable for a battery that can be satisfactorily charged and discharged.

A halide solid electrolyte material according to the present disclosure is used in electrochemical devices, such as batteries (for example, all-solid-state batteries).

What is claimed is:

1. A halide solid electrolyte material represented by the following chemical formula (I):

$$Li_{6-(4+a)b}(Zr_{1-a}M_a)_bX_6 \quad (I)$$

wherein

M denotes at least one element selected from the group consisting of Ta and Nb,

X denotes at least one halogen element, and the following mathematical formulae are satisfied:

$0<a<1$, and $0<b<1.5$.

2. The halide solid electrolyte material according to claim 1, wherein the following mathematical formula is satisfied:

$0.0 \leq a \leq 0.7$.

3. The halide solid electrolyte material according to claim 2, wherein the following mathematical formula is satisfied:

$0.01 \leq a \leq 0.4$.

4. The halide solid electrolyte material according to claim 1, wherein the following mathematical formula is satisfied:

$0.5 \leq b \leq 1.3$.

5. The halide solid electrolyte material according to claim 4, wherein the following mathematical formula is satisfied:

$0.8 \leq b \leq 1.1$.

6. The halide solid electrolyte material according to claim 1, wherein the halide solid electrolyte material is represented by the following chemical formula (II):

$$Li_{6-(4+a)b}(Zr_{1-a}M_a)_bCl_{6-x-y}Br_xI_y \quad (II)$$

wherein the following mathematical formulae are satisfied:

$0 \leq x \leq 6$, $0 \leq y \leq 6$, and $(x+y) \leq 6$.

7. The halide solid electrolyte material according to claim 6, wherein the following mathematical formula is satisfied:

$(x+y)<6$.

8. A battery comprising:
a positive electrode;
a negative electrode; and
an electrolyte layer between the positive electrode and the negative electrode,
wherein at least one selected from the group consisting of the positive electrode, the negative electrode, and the electrolyte layer contains the halide solid electrolyte material according to claim 1.

* * * * *